United States Patent
Atherton

[15] 3,691,960
[45] Sept. 19, 1972

[54] CRYOGENIC MAGNET FORCE APPLICATION MEANS AND METHOD

[72] Inventor: David L. Atherton, Toronto, Ontario, Canada

[73] Assignee: Ferranti-Packard Limited, Toronto, Ontario, Canada

[22] Filed: March 30, 1970

[21] Appl. No.: 23,603

[52] U.S. Cl. ............... 104/148 SS, 335/216, 335/219
[51] Int. Cl. ....... B61b 13/08, H01f 7/00, H02k 41/00
[58] Field of Search ................ 335/216, 219; 308/10; 248/206 A; 104/148 MS, 148 SS

[56] References Cited

UNITED STATES PATENTS 3,470,828   10/1969   Powell, Jr. et al. ...104/148 SS

*Primary Examiner*—Arthur L. La Point
*Assistant Examiner*—George H. Libman
*Attorney*—Westell & Hanley

[57] ABSTRACT

Magnetic force developed between a cryogenic magnet and a field is transferred to a load by a third field forming member which is spaced from but which magnet reacts with the cryogenic member and the third field forming member is joined to a load by a massive support.

18 Claims, 7 Drawing Figures

PATENTED SEP 19 1972  3,691,960

INVENTOR.
DAVID L. ATHERTON
BY
*Westell & Hanley*

PATENTED SEP 19 1972 3,691,960

INVENTOR.
DAVID L. ATHERTON
BY
*Westell & Hanley*

CRYOGENIC MAGNET FORCE APPLICATION MEANS AND METHOD

This application relates to structures or systems wherein there are utilized the forces of magnetic fields produced by cryogenic magnet coils, i.e., current conducting coils in extremely low temperature environments.

In such cryogenic coils, there is produced a field from an electromagnet whose coil is cooled to a very low temperature to achieve the resistance reductions in the coils which result from the temperature reductions, where, as is here assumed, the choice of conducting materials for the field forming coils, to obtain such resistance reductions at low temperature, is suitably made.

This application is concerned with applications of the force developed by such a cryogenic magnet field and the repulsive or attractive force developed by such field in interaction with a field exterior thereto. The exterior field may be produced by a static coil, permanent magnet or magnetic material or may, in applications where the cryogenic coil moves relative to a conductor, be an eddy current field produced by the movement of the cryogenic magnet field relative to a conductor.

By 'magnetic material' is included paramagnetic and diamagnetic materials where the presence of a magnetic field adjacent those materials will create in the material, a field in the same sense (paramagnetic) or in the opposite sense (diamagnetic).

The cryogenic magnet, for use with this invention, uses low temperature to obtain a reduced but finite resistance or to enable the conductor to become superconducting. In all cases, the coil materials to achieve such resistance reduction or elimination are well known to those skilled in the art.

It is noted that, when a coil of super-conducting material is in a super-conducting state, no external power need be supplied to the field forming coils in the cryogenic magnet, while with those applications where the resistance is merely reduced, external power is required. In both cases the cost of supplying electric power is reduced, but there is encountered the additional expense of maintaining the supply of refrigerant (usually liquid helium). Accordingly a major problem is the minimizing of heat flow to the cryogenic magnet, reducing the demands on the refrigerating unit.

However with the applications for all the cooled magnets described in the two preceding paragraphs, (all of which are intended to be included in the term "cryogenic magnet") a problem exists about minimizing the conduction of heat along the support for the cryogenic magnet. Where the force exerted on the cryogenic magnet by the exterior field is, transferred through a structural member connecting the cryogenic magnet to a load, the structural member cannot be made thin to reduce thermal conduction, but must be made sufficiently massive to transfer to its support or load, the force exerted on the cryogenic member and hence heat loss is encountered in amounts determined by the massiveness of the support.

In prior art suggestions as to the design of applications where the lifting (or equivalent magnitude) force of the cryogenic magnet is to be used, a support member for the cryogenic magnet has also been the structural member for transmitting the force from the cryogenic magnet to its load, active or reactive. The increased thermal conduction caused by the use of a massive instead of a thin support (which latter would be all that was required if the only requirement of the support was to position the cryogenic magnet) increases the demand on the refrigerant and refrigerating unit.

It will be noted that for an equivalent force exerted on the cryogenic magnet, that the structural connection will have to be more massive when the force between the cryogenic magnet and its load is compressive rather than tensile since this is a characteristic of members designed for compressive stresses. However, in both compressive and tensile design cases, the necessary relative massiveness of the support conducts relatively large amounts of heat to the cryogenic magnet.

The invention provides a structural design such that the magnetic force on the cryogenic magnet obtained by interaction between an exterior field forming member and the cryogenic magnet, is transferred from the cryogenic magnet to its load through magnetic force between the cryogenic magnet and a spaced second field forming member (usually located on the opposite side of the cryogenic magnet from the first field) and by a structural support between the second field forming member and the cryogenic magnet load. In this way the structural support although massive, does not conduct heat to the cryogenic magnet, because of the spacing between the second field forming member and the cryogenic magnet, nor does the support for the cryogenic magnet conduct much heat since it may now be made thin rather than massive.

Means for ensuring suitable thermal environments for cryogenic magnets are well known and details will not here be given.

In drawings which illustrate a preferred embodiment of the invention:

Figure 1:
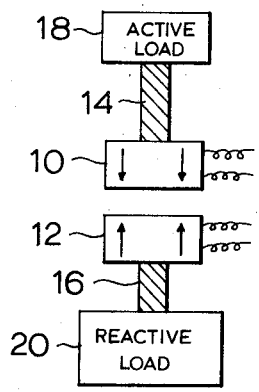
FIG. 1 is a schematic view showing the use of a cryogenic magnet with compressive force transfer in accord with the prior art.

In FIG. 1 is shown a cryogenic magnet 10 having its field polarized in the opposite direction to a field forming coil 12 located therebelow. Details of these coils are not shown since they are well known in the art. Although many applications of the principles of the invention will be dynamic, the example shows a static application for ease of initial explanation. Thus the repulsive force between the two magnets is used to support an active load 18 above a reactive load 20. It will be noted that the active load may be anything to be supported by the force and the reactive load may be the ground or the support. It will be noted that the force between the exterior field forming member 12 and the reactive load will be transmitted to a member 16 which may be short or substantially nonexistent, in other words, the field forming member 12 may be directly on the reactive load 20. Also, it will be noted, that the active load 18 is supported above the cryogenic magnet 10 by a structural member 14 and it will be noted that the force exerted on the structural member 14 due to the weight of the active load 18 and the upward force on the cryogenic magnet 10, is compressive and that the massiveness of the column must be correspondingly designed. Thus, in the drawing of FIG. 1, it will be noted that the massive structural member 14 provides a large thermal conduction path 14 from the load 18 to the cryogenic magnet 10.

Figure 2:
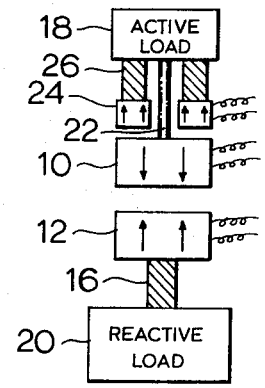
FIG. 2 is a schematic view showing a cryogenic magnet with compressive force transfer in accord with the principles of this invention.

In FIG. 2 is a similar schematic view which illustrates the inventive development as applied to a compressive loading. The cryogenic magnet 10, the exterior field forming member 12, the active and reactive loads 18 and 20 and the support 16 between the reactive load and the field forming member 12 are the same as in FIG. 1. However the cryogenic magnet is merely connected to the active load 18 by a thin member 22 which may be eliminated in certain situations to be discussed hereafter. On the side of the cryogenic magnet 10 remote from field forming member 12 is an electromagnet or field forming member 24 which is connected for compressive loading to the active load 18 by a massive structural member 26. It will be noted that the application is the same as in FIG. 1 and that the force between cryogenic magnet 10 and field forming member 12 is therefore repulsive. Similarly the polarization of the field forming member 24 is such that repulsion takes place between the third field forming member 24 and the cryogenic magnet 10. It will be noted that due to the repulsive force between the members 24 and 10 that the compressive force between members 10 and 18 may be borne to an extent by the massive member 26. It will be seen that this allows reduction in the thickness of member 22 and a consequent reduction in heat conduction in the member 10 since spacing is achieved between the members 24 and 10 so that no conduction takes place across the air gap therebetween. It will also be seen that by adjustment of the strength of member 24 and by the closeness of spacing, as large a proportion of the mass of active load 18 may be borne by the massive member 26 as possible and thus, as a structural member, the member 22 may be completely eliminated and exists only for positioning the cryogenic member 10. In fact, if desired, the repulsive force between the members 10 and 24 may be made so great that member 22 is in tension — if this is desirable. It will be appreciated further that if other types of suitable positioning means are used without heat loss, that the member 22 could therefore be eliminated. In any event, however, it will be noted that the heat loss by conduction is much reduced by the process. Moreover, it will be noted, that in most applications, the clearance between the member 24 and the member 10 may be made much smaller than the clearance between the members 10 and 12, hence the power requirements for the electromagnetic coil 24 will be much less than for the cryogenic member 10. Hence the power economies, well known from using the cryogenic member 10 are not lost since the member 24 does not need to have equivalent power demand.

It will be also noted that the member 24 need not be an electromagnet but could be a permanent magnet of suitable polarity or magnetic material. Conceivably also the member 10 could move relative to the member 24 as well as to member 12, so that the spacing between and the force transfer between members 10 and 24 would occur due to eddy currents generated in the member 24. In this event, of course the cryogenic magnet 10 would be supported independently of the member 24.

Figure 6:
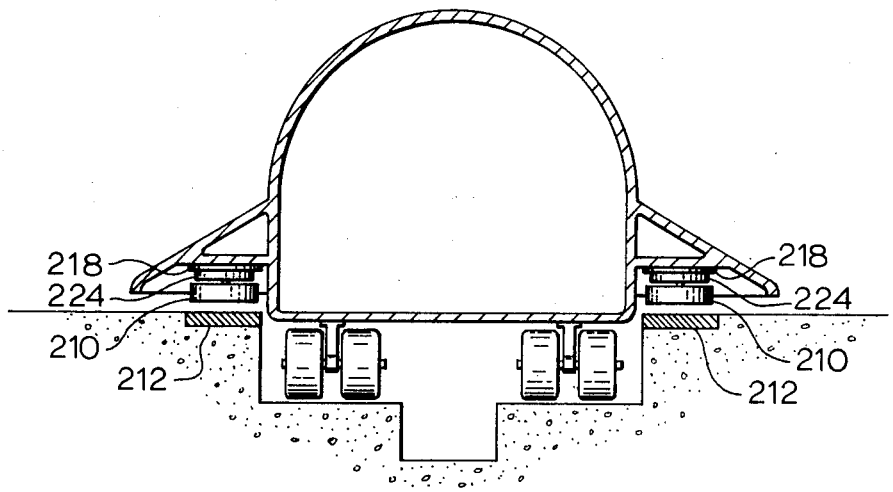
FIG. 6 shows an application of the device to a magnetically suspended train.

Although the reactive load is here shown as spaced from the field forming member 12, it should be realized that, in fact, the field forming member 12 will usually be located directly on top of the reactive load. Although the reactive load has been described as containing a discrete coil it will be realized that one of the principle applications of the invention is in dynamic transportation systems where the member 12 will not be a discrete coil but merely a conductor, and the field shown as emanating from the member 12 in the drawings, will be generated by the eddy currents as the cryogenic member 10 moves relative to the conductor 12. This has application in conveyors, magnetic trains, and applications of this type. In such applications, it will be noted that for reasons of practicality that the upper surface of member 12 will be a rail 212 such as shown in FIG. 6 and that the clearance between the rail and the cryogenic member 210 must be greater than is required between members 210 and 224 for the practical reason of variation in rail height and rail undulations climatic and otherwise. Thus the economies available for power in the member 24 relative to the cryogenic member 10 are available. The scheme of FIG. 2 is illustrated in FIG. 6 where a schematic view of a magnetically suspended train is encountered and where the upwardly directed field from the rails is generated by eddy currents. (It will be noted that these eddy currents may be formed in the rails themselves or by discrete loops placed along the track) but that, in either event, such eddy currents are only generated at high speeds. Hence a wheel suspension as shown would be provided on such a train or other transportation system for supporting the train at slow speeds.

The invention, as far as this embodiment is concerned, and indeed in a more general sense, may be considered as an improvement over U.S. Pat. No. 3,470,828 where a train is supported by the repulsion of a cryogenic magnet but where the cryogenic magnet is connected to the train it supports by massive structural members.

Figure 5:
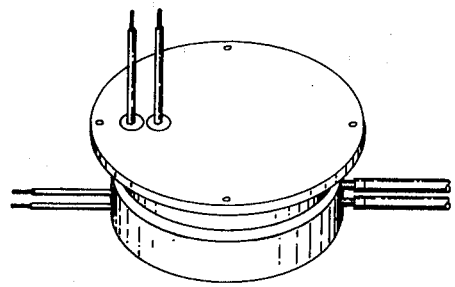
FIG. 5 is a view of the exterior of the device of FIG. 4.
Figure 4:
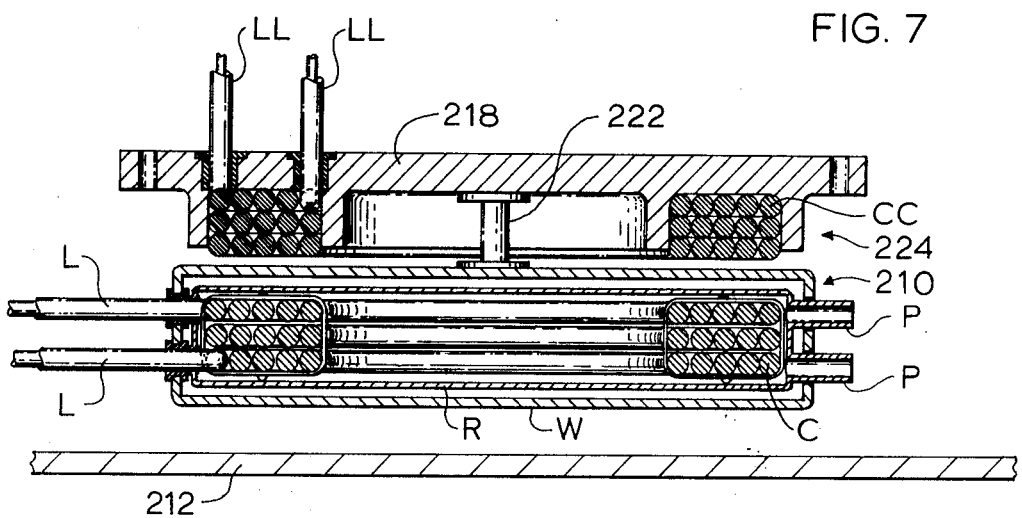
FIG. 4 is a view of the application of the invention of FIG. 2 to a massive unit.

The cryogenic suspension device of FIG. 6 is shown in somewhat more detail in FIGS. 4 and 5. The cryogenic magnet 210 is moved with the train and the field created by the current carrying coils C generates eddy currents in the conducting 'rail' 212 which is an electrical conductor suitable for the purpose, preferably aluminum. The eddy currents create a field which opposes that of cryogenic magnet 210 and at sufficient speed this repulsive force (taking into account that there will be a multiplicity of these units) will be sufficient to suspend the train spaced from the rail 212 if the repulsive force is transmitted to the plate 218 and from there to the train. In accord with the principles of the invention, the force exerted by the field 212 on magnet 210 is transmitted to member 218 by providing, rigidly mounted in member 218 an electromagnet 224. This magnet has coils CC energized by leads LL to produce a field opposing the field of cryogenic magnet 210. The repelling force due to such opposing force, being the entire weight of the train divided by the number of units similar to the one shown may be transferred due to such repulsion. Thus member 222 which acts to position cryogenic magnet 210 relative to plate 218 may have zero stress thereon. If for any reason it is advisable to have some stress on member 222 it will be noted that an increase in repulsive force over the equality value provided by coil CC, will put member 222 in tension and a reduction in repulsive force over the equality value, will put member 222 in compression. However the compressive force borne by the repulsive force between members 210 and 224 will be greater than one-half and preferably a very high proportion of the mean lifting force between members 210 and 212. Hence no conduction of heat takes place over the air gap between members 210 and 224 and normal conduction over member 222 which may now be made thin.

The reason that the term 'mean lifting force' is used is that, in many practical applications, the lifting force will vary up and down during transient situations. Thus transient forces between the track and the train could vary in such a manner that the repulsive force between members 210 and 224 will, for a short interval be less than one-half lifting forces between members 210 and 212. However stress on the member 222 may be avoided by buffers between members 24 and 10 which only make buffering contact during the momentary existence of such large stresses. Thus while, at the time of such stresses, there is additional thermal conduction loss across the buffers, this takes place only for a short interval. At other times the repulsive force between members 210 and 224 will be greater than one-half and usually a very high proportion of the mean lifting force between members 210 and 212.

It will be noted that since rail tolerances are involved in the spacing between members 212 and 210, that the clearance must be several times greater than the spacing between members 224 and 210. Thus the ampere turns required for ordinary electromagnet 224 are much less than for cryogenic magnet 210, and the power demands are much less. Hence the economies of the cryogenic magnet are not lost.

With the train application shown in FIGS. 4–6 the force between members 210 and 224 will usually be made such that member 222 is in tension of a magnitude to allow zero stress or light compressive stress under excessive transient conditions.

The cryogenic magnet is not shown in detail as its construction is well known. Pipes P involve the supply and return of liquid helium to the coolant space between and about the coils C. A cold skin R and a warm skin W are preferably separated by a vacuum or partial vacuum. The insulation is not shown.

Figure 3:
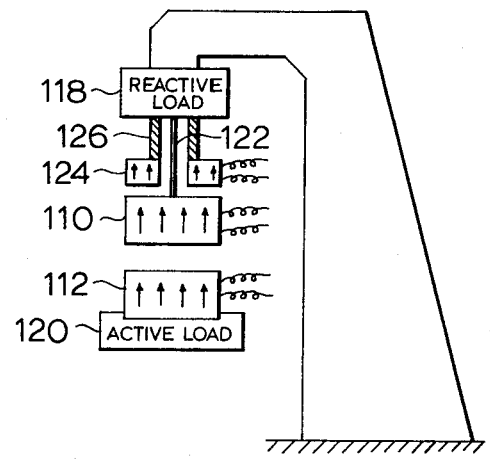
FIG. 3 is a view of tensile force transfer in accord with the principles of the invention.

In FIG. 3 a cryogenic magnet 110 is shown supplying lifting force to and lifting the electromagnet 112 with load 120 by means of magnetic fields in the same direction, i.e., attracting. The positioning member 122 for the member 110 may be made thin, limiting heat conduction, since the lifting force for coil 110 is supplied by coil 124 connected to support a reactive load 118 by a massive tensile connection 126 to an electromagnet 124 which has a field, attractive relative to cryogenic magnet 110, and closer to it than to magnet 112. Hence the major 'lift' is along massive member 126 and thermal conduction along member 122 is minimal. Further due to the closer spacing of magnet 124 than magnet 112 to magnet 110, smaller current may be used in magnet 124 than magnet 110 thus avoiding loss of the cryogenic magnet economies.

With a small positioning member 122, the force of magnet 124 may be made slightly greater than required, putting member 122 in compression, or slightly less than required putting member 122 in tension, or in between member 122 may have no stress thereon.

It will be noted that the field forming member 24 (FIG. 2), 124 (FIG. 3) or 224 (FIGS. 4–6) may be permanent magnets (of suitable polarity) instead of electromagnets, or could be of paramagnetic or diamagnetic material (or could be a conductor for the production of eddy current fields if the conductor moves relative thereto).

Figure 7:
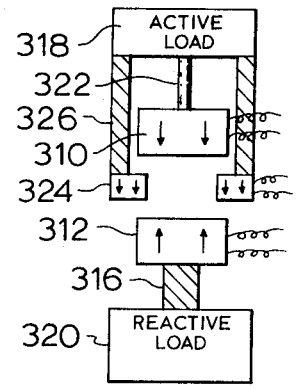
FIG. 7 shows an alternative to the devices of FIGS. 2 and 3.

In FIG. 7 is shown, an example of an arrangement where first and second exterior field forming members are on the same side of the cryogenic magnet.

Here the cryogenic magnet 310 is supported by member 322 from the active load. The active load is supported by the force developed between the cryogenic magnet 310 and the field forming member 312. However the majority of this force is not transmitted through support 322 for the cryogenic magnet 310 but rather through the member 326 which supports an annular field forming member 324 located intermediate members 312 and 310. Member 324 forms a field polarized to cause member 310 to attract member 324. In this way the majority of the lifting force for load 318 is transferred by this attraction and by structural member 326 rather than by member 322. (It is true that some of the weight of structural member 318 is borne by repulsion between members 324 and 312 but this will be a small part of the total load).

I claim:

1. A device using the magnetic forces exerted upon a cryogenic magnet by a first magnetic field forming member located on one side of said cryogenic magnet, including means for transferring the forces exerted on the cryogenic magnet by a first field forming member to a load comprising:

a second magnetic field forming member,
   said second magnetic field forming member providing a field which, through interaction with the field of said cryogenic magnet, produces a force on said second field forming member which is in the same direction as the force exerted by said first field forming member on said cryogenic magnet;
   and a structural member connecting said second field forming member and said load transferring the forces exerted by said cryogenic magnet on said second field forming member to said load.

2. The arrangement as claimed in claim 1 wherein said second field forming member is located on the opposite side of said cryogenic magnet from said first field forming member.

3. The arrangement as claimed in claim 2 wherein said second field forming member is located closer to said cryogenic magnet than said first field forming member.

4. The arrangement as claimed in claim 2 wherein the second field forming member and the cryogenic magnet are arranged and energized so that said structural member transfers to said load, more than half the mean force exerted by said first field forming member on said cryogenic magnet.

5. The arrangement as claimed in claim 3 wherein the second field forming member and the cryogenic magnet are arranged and energized so that said structural member transfers to said load, more than half the mean force exerted by said first field forming member on said cryogenic magnet.

6. The arrangement as claimed in claim 2 wherein the forces between said first field forming member and said cryogenic magnet and the force between said second field forming member and said cryogenic magnet are repulsive and the stress on said structural member is compressive.

7. The arrangement as claimed in claim 3 wherein the forces between said first field forming member and said cryogenic magnet and the force between said second field forming member and said cryogenic magnet are repulsive and the stress on said structural member is compressive.

8. The arrangement as claimed in claim 4 wherein the forces between said first field forming member and said cryogenic magnet and the force between said second field forming member and said cryogenic magnet are repulsive and the stress on said structural member is compressive.

9. The arrangement as claimed in claim 5 wherein the forces between said first field forming member and said cryogenic magnet and the force between said second field forming member and said cryogenic magnet are repulsive and the stress on said structural member is compressive.

10. The arrangement as claimed in claim 6 wherein said cryogenic magnet and said second field forming member are mounted on a movable vehicle and a conductor passed by said cryogenic magnet during movement generates eddy currents to constitute said first field forming member.

11. The arrangement as claimed in claim 7 wherein said cryogenic magnet and said second field forming member are mounted on a movable vehicle and a conductor passed by said cryogenic magnet during movement generates eddy currents to constitute said first field forming member.

12. The arrangement as claimed in claim 8 wherein said cryogenic magnet and said second field forming member are mounted on a movable vehicle and a conductor passed by said cryogenic magnet during movement generates eddy currents to constitute said first field forming member.

13. The arrangement as claimed in claim 9 wherein said cryogenic magnet and said second field forming member are mounted on a movable vehicle and a conductor passed by said cryogenic magnet during movement generates eddy currents to constitute said first field forming member.

14. A moving vehicle having a cryogenic magnet mounted thereon, a conductor defining the path of said moving vehicle, said vehicle conductor and cryogenic magnet being arranged so that movement of said vehicle creates eddy currents in a conductor which in turn provide a force field repelling said cryogenic magnet and hence exerting a desired force between said conductor and said vehicle; means for transferring to a body on said vehicle the forces exerted on the cryogenic magnet by said eddy currents, comprising:

a second magnetic field forming member;

said second magnetic field forming member providing a field which, through interaction with the field of said cryogenic magnet, produces a force on said cryogenic magnet which is in the opposite sense to the force on said cryogenic magnet which is exerted by said eddy current field;

and a structural member connecting said field forming member and said load transferring the forces exerted by said cryogenic magnet on said second field forming member, to said load.

15. A device as claimed in claim 14 wherein said second magnetic field forming member is located on the opposite side of said cryogenic magnet from said conductor.

16. The arrangement as claimed in claim 15 wherein said second field forming member is located closer to said cryogenic magnet than said first field forming member.

17. The arrangement as claimed in claim 15 wherein said second field forming member and the cryogenic magnet are arranged and energized so that said structural member transfers to said load, more than half the mean force exerted by said first field forming member on said cryogenic magnet.

18. The arrangement as claimed in claim 16 wherein said second field forming member and the cryogenic magnet are arranged and energized so that said structural member transfers to said load, more than half the mean force exerted by said first field forming member on said cryogenic magnet.

* * * * *